United States Patent [19]

Dougherty et al.

[11] 4,211,057
[45] Jul. 8, 1980

[54] COMBINE HARVESTER AUTOMATIC TABLE HEIGHT CONTROL

[75] Inventors: Robert S. Dougherty, Oakville; Walter Hirsch, Don Mills; Rene March, Ballinafad, all of Canada

[73] Assignee: Massey-Ferguson Industries Limited, Toronto, Canada

[21] Appl. No.: 888,277

[22] Filed: Mar. 20, 1978

[51] Int. Cl.² ............................................. A01D 67/00
[52] U.S. Cl. ....................................... 56/10.2; 56/208; 56/DIG. 15
[58] Field of Search ................... 56/208, 10.2, 10.4, 56/DIG. 15, 15.8

[56] References Cited

U.S. PATENT DOCUMENTS

| | | | |
|---|---|---|---|
| 3,402,540 | 9/1968 | Karlsson et al. | 56/208 |
| 3,728,851 | 4/1973 | Van Antwerp | 56/208 |
| 3,808,784 | 5/1974 | Gardner et al. | 56/208 |
| 3,851,451 | 12/1974 | Agness et al. | 56/208 |
| 3,886,718 | 6/1975 | Talbot | 56/208 |
| 4,016,709 | 4/1977 | Hauser et al. | 56/10.2 |

*Primary Examiner*—Jay N. Eskovitz
*Attorney, Agent, or Firm*—Robert L. Farris

[57] ABSTRACT

An automatic table height control for a combine harvester including a height sensing assembly and a control system. The height sensing assembly includes a finger support shaft rotatably journaled on the bottom of the table. A spring is provided to rotate the shaft in one direction. A plurality of ground engaging fingers are pivotally connected to the finger support shaft. A lost motion connection is provided to limit rotation of the finger support shaft relative to each finger. An iron vane is attached to one end of the finger support shaft. A pair of proximity switches are mounted on the crop harvesting table adjacent the path of movement of the iron vane. When the vane is close to both proximity switches, they are open. When one of the ground engaging fingers rotates the iron vane away from one proximity switch that switch closes and energizes a relay in the control system that energizes a solenoid on the header height control valve to raise or lower the table. The position of the proximity switches on the table is adjustable to set the height at which the system holds the table above the ground. The control system includes a switch and timer which automatically raise the table for a given period of time when the ground drive is reversed. The control system also includes a latching relay that deenergizes the automatic control when the combine is reversed and energizes the automatic control when the manual height switch is moved to the position for lowering the table.

5 Claims, 7 Drawing Figures

COMBINE HARVESTER AUTOMATIC TABLE HEIGHT CONTROL

This invention relates to an improved combine harvester automatic table height control.

Automatic table height controls are well-known on a variety of harvesting machines. These machines normally have a pair of hydraulic cylinders for raising and lowering the table and a valve for directing hydraulic fluid from a pump to the cylinders or from the cylinders to a sump. The automatic portion of the table height control is normally either mechanical or a combination of electrical and mechanical.

The known mechanical systems employ a plurality of fingers on the bottom of the harvester table for sensing changes in the distance from the table to the ground. A mechanical linkage is attached to the fingers and the valve for directing hydraulic fluid to and from the cylinders. Adjustments are made by changing the length of one or more members of the linkage. These mechanical systems are susceptible to damage. Friction in the pivot points and connections and inertia make the systems sluggish and unresponsive.

The known combination electrical and mechanical systems have fingers on the bottom of the harvester table for sensing changes in the distance from the table to the ground. When the distance sensed by the fingers is either more or less than the desired distance, the fingers rotate a member that contacts a switch of some type which supplies current to a solenoid to raise or lower the table. The switches used on the known systems have been susceptible to malfunctions and damage caused by dirt, dust, rocks and crop material. Adjustments to change the height at which these known controls maintain the table have been difficult to make.

The ground sensing fingers have presented problems with all known systems. They have been prone to damage, especially when the harvester moves backwards. In some soil conditions, the fingers cut through the surface and give a false reading due to the load to be supported by the fingers. Inertia in the fingers tends to delay response of the height control system.

The improved combine harvester automatic table height control system is for a combine harvester with a frame, driven wheels supporting the frame above the ground, a drive on the frame connected to the driven wheels, an elevator housing pivotally attached to the frame, a crop harvesting table attached to the free end of the elevator housing, a hydraulic cylinder attached to the frame and the elevator housing operable to raise and lower the crop harvesting table, and a hydraulic valve for directing hydraulic fluid to and from the hydraulic cylinder. A height sensing assembly is attached to the bottom of the crop harvesting table. A control system is attached to the height sensing assembly and to the hydraulic valve. The control system includes a switch connected to the drive for the driven wheels which raises the table when the drive is reversed.

The control system includes a timer which limits the time period during which the crop harvesting table is raised when the switch connected to the drive for the driven wheels is closed.

The control system also includes a latching circuit connected to the switch which is connected to the drive for the driven wheels. The latching circuit deactivates the automatic height control when the timer discontinues raising the table.

A manual switch is provided on the combine for raising and lowering the crop harvesting table. The manual switch will override the automatic control to raise or lower the table. When the manual switch is moved to neutral, the control system will immediately continue the automatic adjustment of the table height. When the latching circuit has deactivated the control system, for automatically controlling table height, moving the manual switch to a lower position will reactivate the control system.

The height sensing assembly includes a finger support shaft pivotally journaled on the bottom of the crop harvesting table. A spring is provided to rotate the shaft in one direction. A plurality of ground engaging fingers are pivotally attached to the finger support shaft. A lost motion connection between each of the fingers and the shaft is provided to ensure that the position of the shaft relative to the table is controlled by the finger which contacts the point on the ground that is closest to the crop harvesting table. The maximum load on any one finger on the ground is the load exerted by the spring that is connected to the shaft and part of the weight of the finger. One ground engaging finger does not have to support another ground engaging finger under normal conditions.

An iron vane is secured to an end of the finger support shaft. A pair of proximity switches are secured to the crop harvesting table adjacent the iron vane. These proximity switches activate the control system to raise or lower the table when the iron vane moves away from one or the other of the proximity switches. The position of the iron switches relative to the table is adjustable to set the height at which the table is maintained above the ground. The distance between the proximity switches is adjustable to set the allowable variation in the height of cut at the point where the crop harvesting table is closest to the ground.

Figure 1:
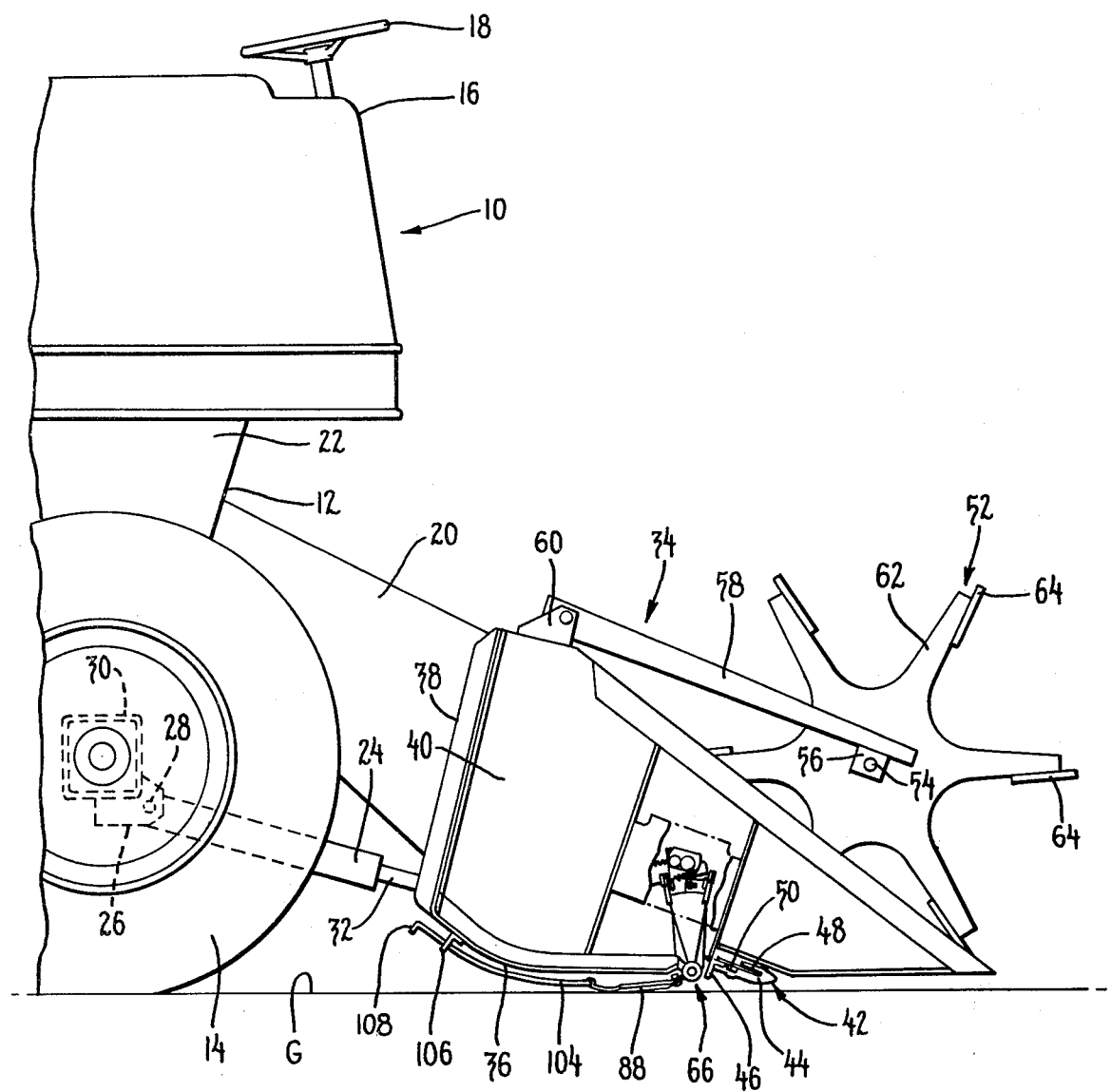
FIG. 1 is a side elevation of the front portion of a combine harvesting and threshing machine and a grain harvesting table with the improved automatic table height control.

The combine harvester 10 as partially shown in FIG. 1 includes a frame 12 supported above the ground G by a plurality of wheels 14. An operator's station 16 is mounted on the forward portion of the frame 12. The operator's station 16 includes a steering wheel 18 and other controls required to operate the combine harvester 10.

An elevator housing 20 has its rear end pivotally attached to the front portion of the frame 12. A conveyor assembly (not shown) inside the elevator housing 20 conveys crop material to the threshing and cleaning assemblies inside the combine harvester body 22.

A hydraulic cylinder 24 has one end pivotally attached to a pair of brackets 26 by a pin 28. The brackets 26 are welded to the front axle 30. The front axle is an integral part of the frame 12. The other end of the hydraulic cylinder 24 is pivotally attached to the forward end of the elevator housing 20. Extension and retraction of the piston rod 32 of the hydraulic cylinder 24 pivots the rear end of the elevator housing 20 about its pivotal connection to the frame 12 and thereby raises and lowers the forward end of the elevator housing. Most combine harvesters employ two hydraulic cylinders 24 for raising and lowering the forward portion of the elevator housing 20. The number of hydraulic cylinders 24 which are used depends upon the weight of the crop harvesting table 34 and the size of each hydraulic cylinder 24 used.

The crop harvesting table 34 is detachably connected to the front end of the elevator housing 20. The crop harvesting table 34 includes a table bottom 36 a table back wall 38 and a pair of table end walls 40. A knife assembly 42 is attached to the forward edge of the table bottom 36 and extends from one table end wall 40 to the other table end wall 40. The knife assembly 42 includes a plurality of knife guards 44 rigidly secured to an angle iron 46 on the forward edge of the table bottom 36 and a plurality of knife sections 48 on a bar 50. The bar 50 is reciprocated back and forth by a drive (not shown) to sever crop material.

A reel 52 with a reel shaft 54 rotatably journaled in bearing blocks 56, is supported on reel support arms 58 attached to a bracket 60 on each table end wall 40. The reel 52 includes a plurality of reel spiders 62. Six reel bats 64 are secured to the reel spiders 62. The reel shaft 54 is driven so that the reel bats 64 hold the crop material as it is being cut by the knife assembly 42. The reel bats 64 also assist in moving cut crop material from the knife assembly 42 to the rear where it is received by conveyors. These conveyors carry the crop material to the threshing and separating mechanisms in the combine harvester body 22.

Crops such as soybeans should be severed by the knife assembly 42 as close to the surface of the ground G as possible. This would be relatively simple if fields were perfectly level, and had a uniform surface without soft spots. In practice, it is found that fields have small ridges which are difficult to see from the operator's station 16. Also, the surface of the ground G will usually have some soft spots which will allow one of the wheels 14 to sink in the ground more than the other. This results in lowering one end of the crop harvesting table 34 and raising the other end of the crop harvesting table 34. Ridges and soft spots in fields frequently result in the table bottom 36 and the knife assembly 42 contacting the ground G. Dirt and rocks are often scooped up into the table. When this happens, the operator must stop the machine and clean the dirt and rocks out. Occasionally, the combine harvester 10 is damaged.

Automatic table height controls have been developed to eliminate damage to combine harvesters 10 and to ensure that the crop is severed as low as possible or at the desired height above the surface of the ground G. The automatic table height control includes a height sensing assembly 66 and a control system 68 shown schematically in FIG. 7.

The height sensing assembly 66 includes a finger support shaft 70 rotatably supported by a plurality of bearings 72 under the forward edge of the table bottom 36. The bearings 72 have a rotatable inner race 74 and an outer race 76. The outer race is secured to the angle iron 46. The outer spherical surface of the inner race 74 and the inner spherical surface of the outer race 76 facilitate alignment of the finger support shaft 70 and the bearings 72.

Figures 2, 3:
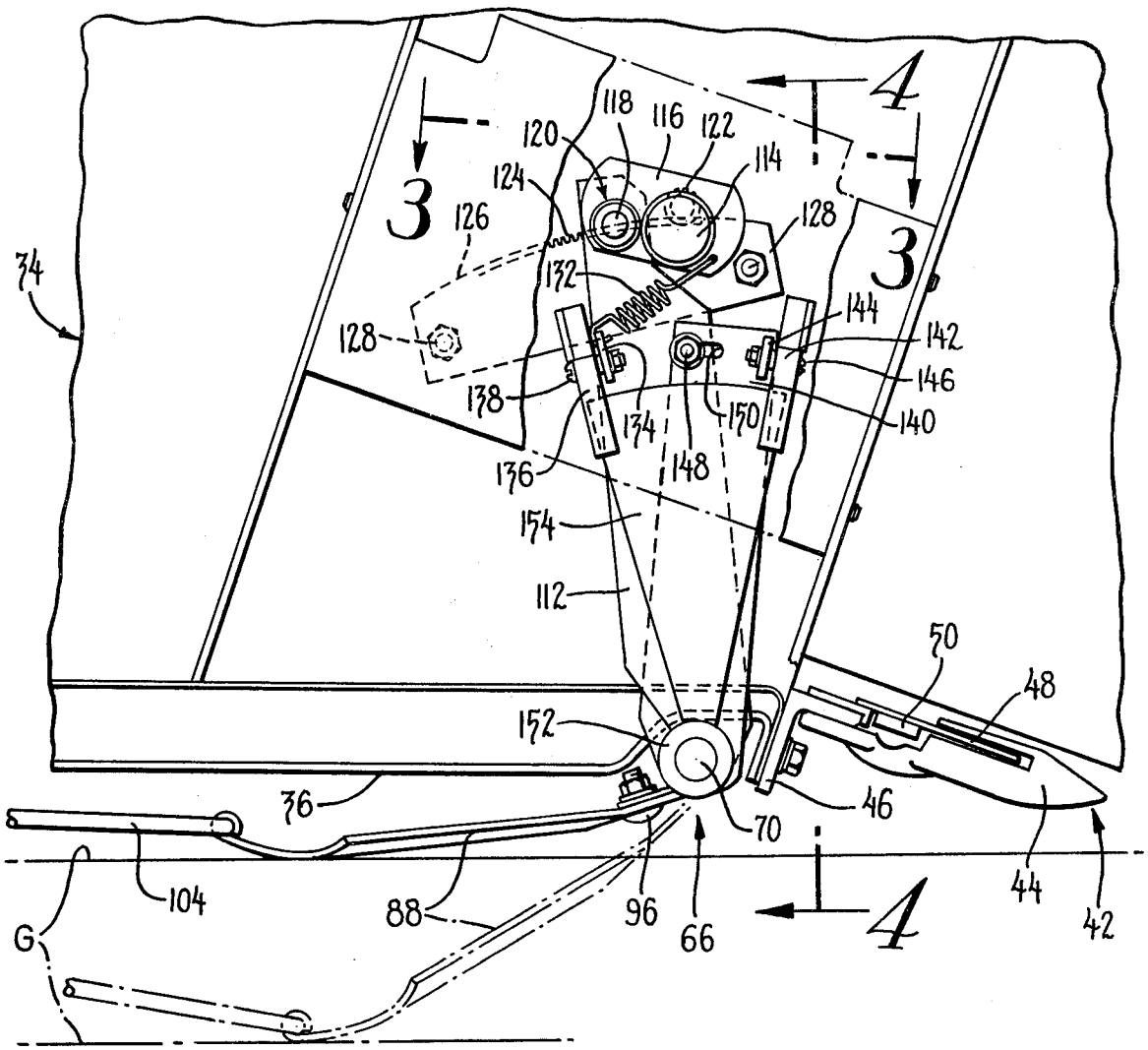
FIG. 2 is an enlarged side elevation of a portion of one end of the grain harvesting table with parts broken away to show details of table height sensing assembly.
FIG. 3 is a partial sectional view taken along lines 3—3 of FIG. 2 showing a portion of the table height sensing assembly.
Figure 6:
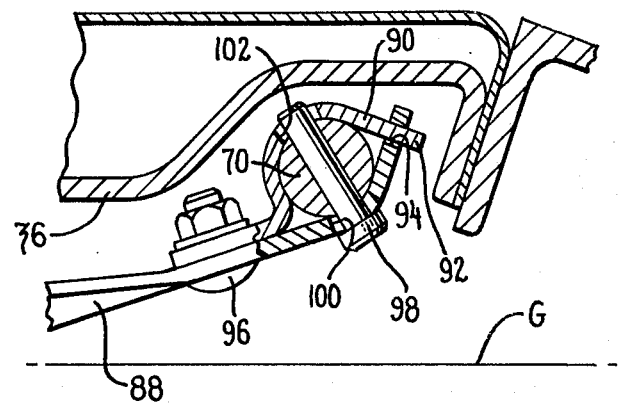
FIG. 6 is a sectional view taken along lines 6—6 of FIG. 4 showing the connection between the ground engaging fingers and the finger support shaft.

A torsion spring 78 surrounds the finger support shaft 70. One end of the coil spring protrudes through an aperture through the outer race 76 of an adjacent bearing 72. The other end of the torsion spring 78 protrudes into an aperture in a collar 80 on the finger support shaft 70. The torsion spring 78 biases the collar 80 toward a pin 82. The pin 82 engages a notch 84 in the side of the collar 80 to resist movement of the collar 80 relative to the finger support shaft 70. The collar 80 can be rotated relative to the finger support shaft 70 to load the torsion spring 78 so that it tends to rotate the finger support shaft 70 counterclockwise as shown in FIGS. 1, 2 and 6. A pin 86 in the finger support shaft 70 is engageable with the portion of the torsion spring 78 that protrudes through an outer race 76 of a bearing 72 to limit rotation of the finger support shaft 70. If required, several of the torsion springs 78 can be provided. Normally, only one torsion spring 78 is required.

A plurality of ground engaging fingers 88 are rotatably secured to the finger support shaft 70 by clips 90. Each clip 90 has a lug 92 on one end that engages in a slot 94 in the forward end of a ground engaging finger 88. The other end of each clip 90 is secured to the ground engaging finger 88 by a carriage bolt 96. The clip 90 and the ground engaging finger 88 are loose on the finger support shaft 70.

A pin 98 passes through a slot 100 in each ground engaging finger 88, through the finger support shaft 70 and through a slot 102 in the clip 90. The pin 98 prevents each ground engaging finger 88 from sliding along the length of the finger support shaft 70. The slots 100 and 102 allow limited rotation of the ground engaging finger 88 relative to the finger support shaft 70. A plurality of holes are provided in the finger support shaft 70 so that each ground engaging finger 88 can be positioned in the desired location along the length of the finger support shaft 70. For some crops, the ground engaging fingers 88 must be positioned to run on top of a ridge or in the valley between ridges on the ground.

Normally, there will be a ground engaging finger 88 about every 50 to 100 centimeters along the length of the crop harvesting table 34. A seven meter table would be provided with seven to fifteen evenly spaced ground engaging fingers 88. The one ground engaging finger 88 in contact with the point on the ground G closest to the table bottom 36 would also be in contact with the pin 98 which holds it in position on the finger support shaft and would rotate the finger support shaft 70 against the bias of the torsion spring 78. The remaining six to fourteen ground engaging fingers 88 normally would not be trying to rotate the finger support shaft 70 in either direction. All but one of the ground engaging fingers 88 has a portion of its weight supported by the ground and a portion of its weight supported by the finger support shaft 70. The one ground engaging finger 88 which is in contact with the point on the ground G that is closest to the table bottom 36, has a portion of its weight and the load resulting from the coil spring 78 supported by the ground. One of the ground engaging fingers 88 does not support the weight of another ground engaging finger during normal operation. The total load supported by a ground engaging finger at any given time is, therefore, small. This results in reduced wear and essentially eliminates the tendency of a ground engaging finger 88 to cut into the ground G and give a false indication.

A rod 104 is pivotally attached to the rear end of each ground engaging finger 88. The rear portion of each of the rods 104 passes through an aperture in an angle iron 106 mounted on the bottom rear portion of the table bottom 36. The free end of each rod 104 has a stop 108. The stop 108 contacts the angle iron 106 to limit movement of the ground engaging fingers 88 when the crop harvesting table 34 is raised to the point that the ground engaging fingers 88 are above the ground G. The rods 104 decrease the possibility of damage to the ground engaging fingers 88 if the combine harvester 10 moves backwards.

A sleeve 110 is rotatably journaled on one end of the finger support shaft 70 adjacent the outside edge of one of the table end walls 40. A plate 112 is rigidly attached to the sleeve 110 and extends upwardly therefrom. A direct current gear head height of cut motor 114 with an integral mount plate 116 is pivotally journaled on a shaft 118 by bearing assembly 120. The shaft 118 is rigidly secured to the upper free end of the plate 112. A retainer 121 holds the bearing assembly 120 on the shaft 118. The output gear 122 on the gear head height of cut motor 114 is in engagement with the gear teeth 124 on the arcuate gear rack 126. The arcuate gear rack 126 is rigidly secured to the table end wall 40 by a pair of carriage bolts 128. Spacers 130, on the carriage bolts 128 between the table end wall 40 and the upper free end of the plate 112, hold the arcuate gear rack 126 out from the table end wall 40 so that the output 122 can fully engage the gear teeth 124 without contacting the table end wall 40. A tension spring 132 is attached at one end, to a bracket 134 on the side of the plate 112. The other end of the tension spring 132 is attached to the integral mounting plate 116 to bias the gear head height of cut motor 114 about the axis of shaft 118 and hold the output gear 122 in contact with the gear teeth 124.

A raise proximity switch 136 is secured to the bracket 134 by bolts 138. A proximity switch includes a reed switch and a magnet which creates a magnetic field to hold the reed switch closed. A slot is provided in the proximity switch. When an iron member is positioned in the slot, the magnetic field is interrupted and the reed switch springs open.

A second plate 140 is rotatably journaled on the finger support shaft 70 adjacent the sleeve 110. The plate extends upward from the finger support shaft 70 adjacent the plate 112. A lower proximity switch 142 is attached to a bracket 144 on the second plate 140 by bolts 146. The upper ends of the plate 112 and the second plate 140 are secured together by a bolt 148. The bolt 148 passes through a slot 150 in the second plate 140. The slot 150 permits the second plate 140 to be pivoted about the axis of the finger support shaft 70 to adjust the distance between the raise proximity switch 136 and the lower proximity switch 142.

Figure 4:
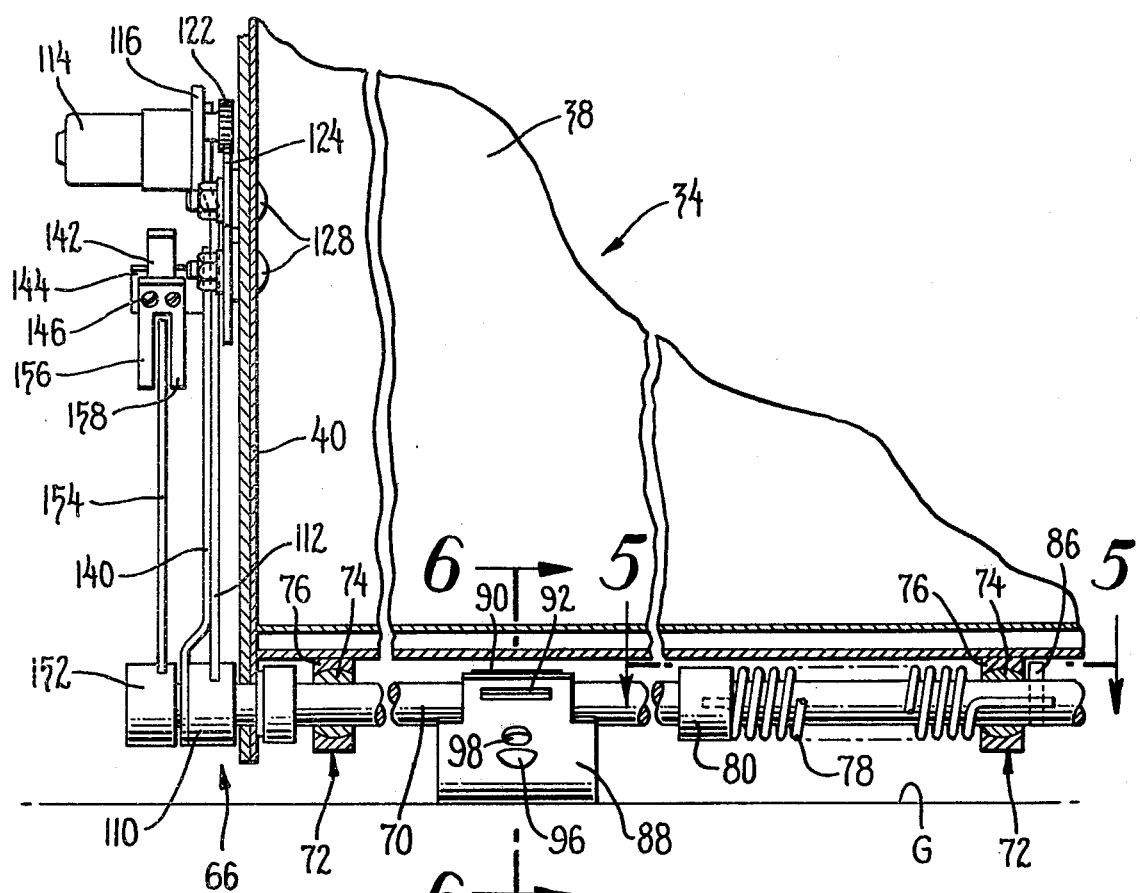
FIG. 4 is a sectional view taken along lines 4—4 of FIG. 2 showing a portion of the table height sensing assembly and the grain harvesting assembly.
Figure 5:
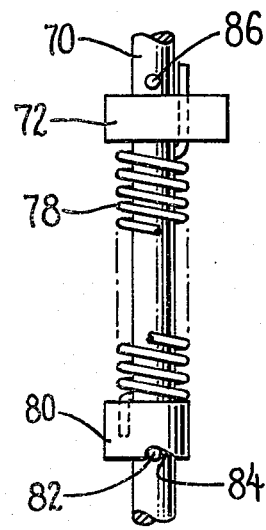
FIG. 5 is a sectional view taken along lines 5—5 of FIG. 4 showing a portion of the table height sensing assembly.

A sleeve 152 is rigidly secured to the outer end of the finger support shaft 70. An iron vane 154 is rigidly attached to the sleeve 152 and extends upwardly. The upper end of the iron vane 154, as shown in FIGS. 1, 2 and 4, is positioned in the slots between the legs 156 and 158 of the raise proximity switch 136 and the lower proximity switch 142. In this position, the iron vane 154 interrupts the magnetic field in both reed switches 136 and 142 and both switches are open.

If the knife assembly 42 is too high along its entire length, the ground engaging fingers 88 will move to phantom line position shown in FIG. 2. This will allow the coil spring 78 to rotate the finger support shaft 70 counterclockwise as shown in FIG. 2. The iron vane 154 will move out from between the legs 156, 158 of the lower proximity switch 142. The lower proximity switch 142 will then close and send a signal to lower the crop harvesting table 34. The control system 68 will then lower the crop harvesting table 34 until the iron vane 154 moves back into the slot between the legs 156, 158 and the lower proximity switch 142 is open.

If the knife assembly 42 is too close to the ground G in one or more places along its length, at least one of the ground engaging fingers 88 will rotate the finger support shaft 70 clockwise against the bias of the coil spring 78 as shown in FIG. 2. This will move the iron vane 154 from between the legs 156, 158 of the raise proximity switch 136. The raise proximity switch 136 will then close and send a signal to raise the crop harvesting table 34. The control system 68 will then raise the crop harvesting table 34 until the iron bar 154 moves back into the slot between the legs 156 and 158 and the raise proximity switch 136 is open.

The height above the ground G at which the automatic table height control will keep the crop harvesting table 34 can be adjusted by operating the gear head height of cut motor 114 to reposition the raise and lower proximity switches 136, 142. The operating range or deadband between the lowest and highest cutting height without moving the crop harvesting table 34 relative to the frame 12 can be adjusted by loosening the bolt 148 and changing the position of the second plate 140 relative to the plate 112. The position of the plate 112 relative to the second plate 140 determines the distance between the raise and lower proximity switches 136, 142 and thereby determines how many degrees the finger support shaft 70 must rotate from the time one proximity is opened until the other proximity switch is closed.

The raise proximity switch 136 might be positioned by the gear head height of cut motor 114 where it will not be closed to raise the table unless the distance from the knife assembly 42 to the ground is less than two centimeters at one place along the length of the crop harvesting table 34. The lower proximity switch 142 might be positioned by sthe bolt 148, relative to the raise proximity switch 136, so that the lower proximity switch 142 will not be closed until the knife assembly 42 is more than seven centimeters above the ground G. This setting would result in a range of five centimeters between the lowest and the highest working heights. The gear head height of cut motor 114 could now be operated to move both proximity switches 136, 142 and change the minimum working height to seven centimeterss, for example. The range would still be five centimeters and the highest working height would not be twelve centimeters.

Figure 7:
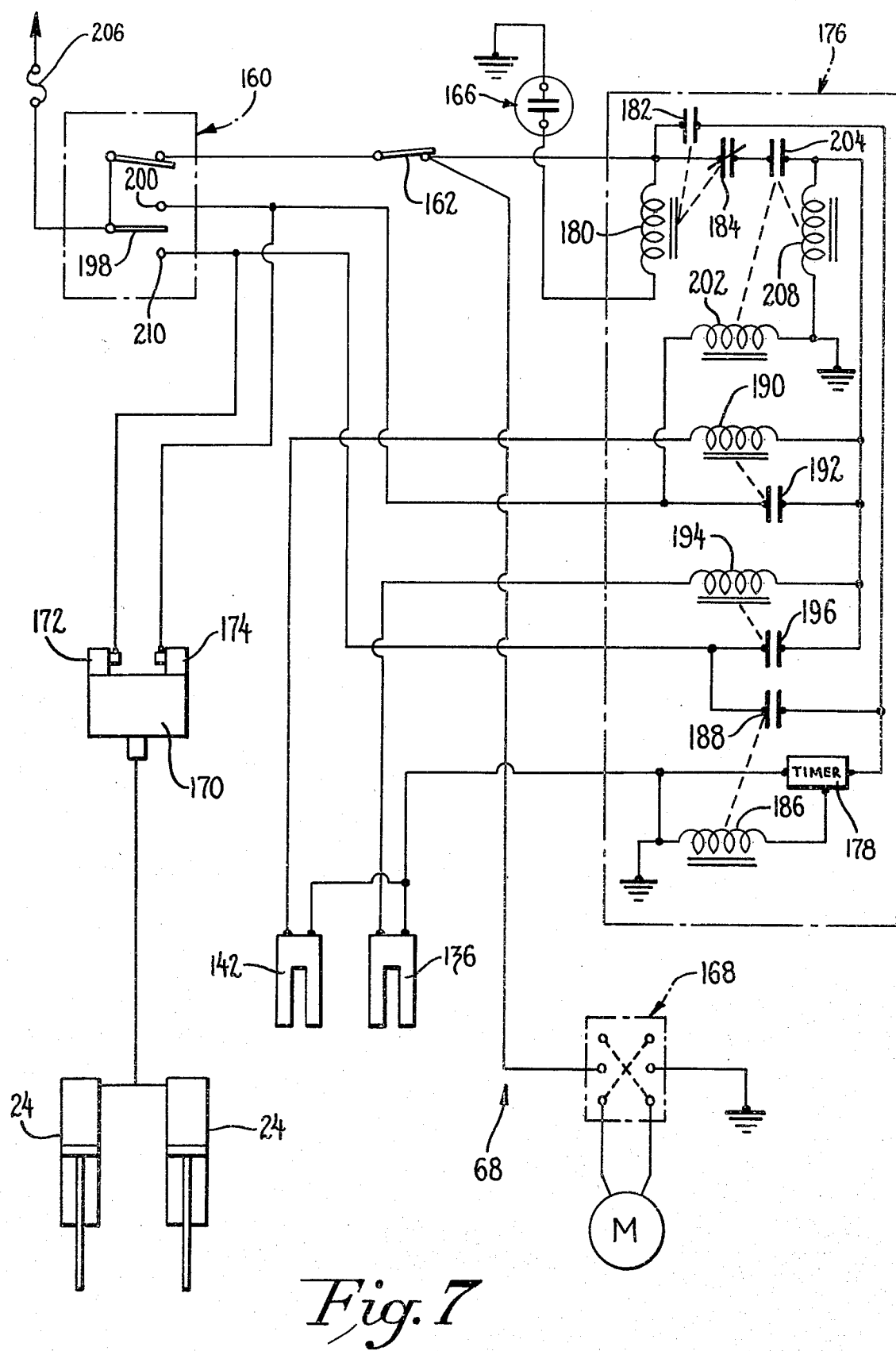
FIG. 7 is a schematic diagram of the electrical control circuit.

The control system 68, as shown in FIG. 7, includes a manual control switch 160, a switch 162 for turning the automatic table height control on and off, a reverse override switch 166, a height of cut switch 168, a header control valve 170 with a table raise solenoid 172, a table lower solenoid 174 and a five module relay 176.

The header control valve 170 directs oil from a pump (not shown) to the hydraulic cylinders 24 to raise the crop harvesting table 34 or from the hydraulic cylinders 24 to the sump (not shown) to lower the crop harvesting table 34. The header control valve 170 is activated by one of the solenoids 172, 174 to lower or raise the crop harvesting table 34. The solenoids are operated either manually by the manual control switch 160 or by the five module relay 176. The five module relay 176 will energize the table raise solenoid 172 in response to a signal from the raise proximity switch 136 or from the reverse override switch 166. The five module relay 176 will energize the table lower solenoid 174 in response to a signal from the lower proximity switch 142.

The height of cut switch 168 operates the height of cut motor 114. The function of this motor is to reposition the proximity switches 136, 142 as was explained above.

At times it is necessary to move a combine backwards. Such a movement can damage the ground engaging fingers 88 if the crop harvesting table 34 is not raised first. The reverse override switch 166 is closed when the combine gear case (not shown) is shifted into reverse to drive the drive wheels 14 backwards. When the five module relay 176 receives a signal from the reverse override switch 166, the table raise solenoid 172 is automatically energized for a timed period determined by the timer 178.

The raise and lower proximity switches 136, 142 send signals to the five module relay 176 to raise or lower the crop harvester table 34 when either the raise or lower sproximity switch 136, 142 is closed. The five module relay 176 is required because the current carried by the raise and lower proximity switches 136, 142 is not sufficient to operate the table raise and lower solenoids 172, 174.

When the switch 166 is closed, current flows through the electromagnet 180 and the switch 182 is closed and the switch 184 is opened. The function of switch 184 will be explained later. The switch 182 energizes the timer 178 which in turn sends current through the electromagnet 186 for a set period of time. The electromagnet 186 closes the switch 188 and current flows to the raise solenoid 172 until the timer 178 stops the flow of current through the electromagnet 186 and the switch 188 opens.

During normal operation of the automatic table height control, when the crop harvesting table 34 is too high, the iron vane 154 moves out of the slot between the legs 156 and 158 of the lower proximity switch 142, the lower proximity switch 142 is closed, the electromagnet 190 is energized, closing the switch 192 and the table lower solenoid 174 is energized. The table lower solenoid 174 holds the header control valve 170 in a lower position until the iron vane 154 moves into the slot between the legs 156 and 158 of the lower proximity switch 142, the lower proximity switch 142 is opened, the table lower solenoid 174 is deenergized, and the header control valve 170 shifts to a hold position.

During normal operation of the automatic table height control, when the crop harvesting table 34 is too low, the iron vane 154 moves out of the slot between the legs 156 and 158 of the raise proximity switch 136, the raise proximity switch 142 is closed, the electromagnet 194 is energized closing the switch 196 and the table raise solenoid 172 is energized. The table raise solenoid 172 holds the header control valve 170 in a raise position until the iron vane 154 moves into the slot between the legs 156 and 158 of the raise proximity switch 136, the raise proximity switch 136 is open, the table raise solenoid 172 is deenergized and the header control valve 170 shifts to a hold position.

Two steps are required to place the automatic table height control in operation. The first step is to close the switch 162. The second required step is to move the manual control switch 160 to the lower position. In the lower position, the member 198 contacts the lower contact 200 thereby energizing the electromagnet 202. The electromagnet 202 closes the switch 204 thereby connecting all the relays in the five module relays 176 to a source of power through a fuse 206. The electromagnet 208 is energized when the switch 204 is closed. The electromagnet 208 then holds the switch 204 closed.

The switch 204 may be opened by opening the switch 162 thereby turning the automatic table height control off. The switch 204 may also be opened by shifting the transmission into reverse. When the transmission is shifted into reverse, the switch 166 is closed, the electromagnet 180 is energized, and the normally closed switch 184 is opened as explained above.

When the switch 184 is opened, the electromagnet 208 is deenergized and the switch 204 is opened. The switch 204 remains open until the electromagnet 202 is energized as explained above.

The two electromagnets 202 and 208, together with the switch 204 constitute a latching relay. This latching relay holds the automatic table height control on until the switch 162 is opened or until the reverse override switch 166 is closed.

The automatic table height control can be overriden at any time by the operator by moving the member 198 of the manual control switch 160 into contact with the raise contact 210. This will energize the table raise solenoid and move the header control valve 170 to the raise position. The header control valve 170 will stay in the raise position until the operator moves the member 198 out of contact with the raise contact 210. As soon as the member 198 moves away from the raise contact 210, the automatic table height control will immediately take over and move the table to the preset height unless it is already within the range of the preset height.

We claim:

1. An improved combine harvester automatic table height control including a combine harvester frame, driven wheels supporting the frame above the ground, drive means on the frame connected to the driven wheels, an elevator housing pivotally attached to the frame, a crop harvesting table attached to the free end of the elevator housing, a hydraulic cylinder attached to the frame and the elevator housing operable to raise and lower the crop harvesting table, a hydraulic valve capable of directing hydraulic fluid to and from the hydraulic cylinder, a height sensing assembly attached to the crop harvesting table, and a control system operably attached to the height sensing assembly and to the hydraulic valve, characterized by the drive means connected to the driven wheels including a reversible transmission, and the control system including a switch connected to the reversible transmission and to the hydraulic valve capable of raising the crop harvesting table upon the reversible transmission being reversed, and wherein the control system also includes a timer connected to the switch connected to the reversible transmission, and to the hydraulic valve operable to limit the time during which the crop harvesting table is raised in response to closing the switch connected to the transmission.

2. The improved combine harvester automatic table height control of claim 1 characterized by the control system including a latching circuit, connected to the switch connected to the reversible transmission, capable of deactivating the control system.

3. The improved combine harvester automatic table height control of claim 2 characterized by a manually operated raise and lower switch connected to the hydraulic valve and to the latching circuit to activate the control system for automatically raising and lowering the crop harvesting table upon being moved to the position for lowering the crop harvesting table.

4. An improved combine harvester automatic table height control including a combine harvester frame, driven wheels supporting the frame above the ground, an elevator housing pivotally attached to the frame, a crop harvesting table attached to the free end of the elevator housing, a hydraulic cylinder attached to the frame and the elevator housing operable to raise and lower the crop harvesting table, a hydraulic valve capable of directing hydraulic fluid to and from the hydraulic cylinder, a height sensing assembly attached to the crop harvesting table, and a control system operably attached to the height sensing assembly and to the control system characterized by the height sensing assembly including a finger support shaft 70 pivotally journaled on the bottom of the crop harvesting table, spring means connected to the finger support shaft and the crop harvesting table capable of rotating the finger support shaft in one direction, a plurality of ground engaging fingers pivotally attached to the finger support shaft, a lost motion means connecting the ground engaging finger to the finger support shaft, an iron vane rigidly secured to the finger support shaft and at least one proximity switch associated with the iron vane, a plate moveably mounted on the crop harvesting table, a pair of proximity switches mounted on the plate adjacent the path of movement of the iron vane and connected to the control system and a height of cut adjustment assembly attached to the plate moveably mounted on the crop harvesting table capable of moving the plate relative to the finger support shaft to adjust the height of cut of the crop harvesting table maintained by the control system.

5. The improved combine harvester automatic table height control of claim 4 characterized by the plate including adjustment means to adjust the distance between the proximity switches.

* * * * *